United States Patent

[11] 3,576,138

[72] Inventor Cornelius Wildhagen
 5112 1/2 Tujunga Ave., North Hollywood, Calif. 91601
[21] Appl. No. 820,746
[22] Filed May 1, 1969
[45] Patented Apr. 27, 1971

[54] REVERSIBLE DRIVE
 7 Claims, 8 Drawing Figs.
[52] U.S. Cl. .................................................. 74/220, 74/227, 74/242.15
[51] Int. Cl. ................................................ F16h 7/02, F16h 7/12
[50] Field of Search .......................................... 74/220, 227, 242.15, 242.11

[56] References Cited
UNITED STATES PATENTS
| 815,433 | 3/1906 | Johnson | 74/220 |
| 915,564 | 3/1909 | Darling | 74/220 |
| 3,165,938 | 1/1965 | Hayes | 74/220 |

*Primary Examiner*—Leonard H. Gerin
*Attorney*—Harris, Kiech, Russell & Kern

ABSTRACT: A reversible drive of the belt-and-pulley type, comprising coaxial, axially spaced drive pulleys and coaxial, axially spaced idler pulleys offset to one side of the drive pulleys and rotatable about an axis perpendicular to and spaced laterally from the axis of the drive pulleys. An endless belt is trained around one of the drive pulleys, one of the idler pulleys, the other of the drive pulleys and the other of the idler pulleys, in that order. A movable mount for the idler pulleys slackens and tightens the belt, while a clutch respectively connects and disconnects the drive pulleys. With the belt slackened and the drive pulleys connected, a direct drive between the drive pulleys is obtained. With the belt tightened and the drive pulleys disconnected, a reverse drive between the drive pulleys is achieved. The belt is an O-ring the built-in memory of which causes it to tend to assume a circular configuration, whereby the belt inherently and automatically disengages the drive pulleys when the belt is slackened and the drive pulleys are connected in direct drive. This precludes rubbing of the belt in direct drive.

PATENTED APR 27 1971

INVENTOR
CORNELIUS WILDHAGEN
BY HIS ATTORNEYS
HARRIS, KIECH, RUSSELL & KERN

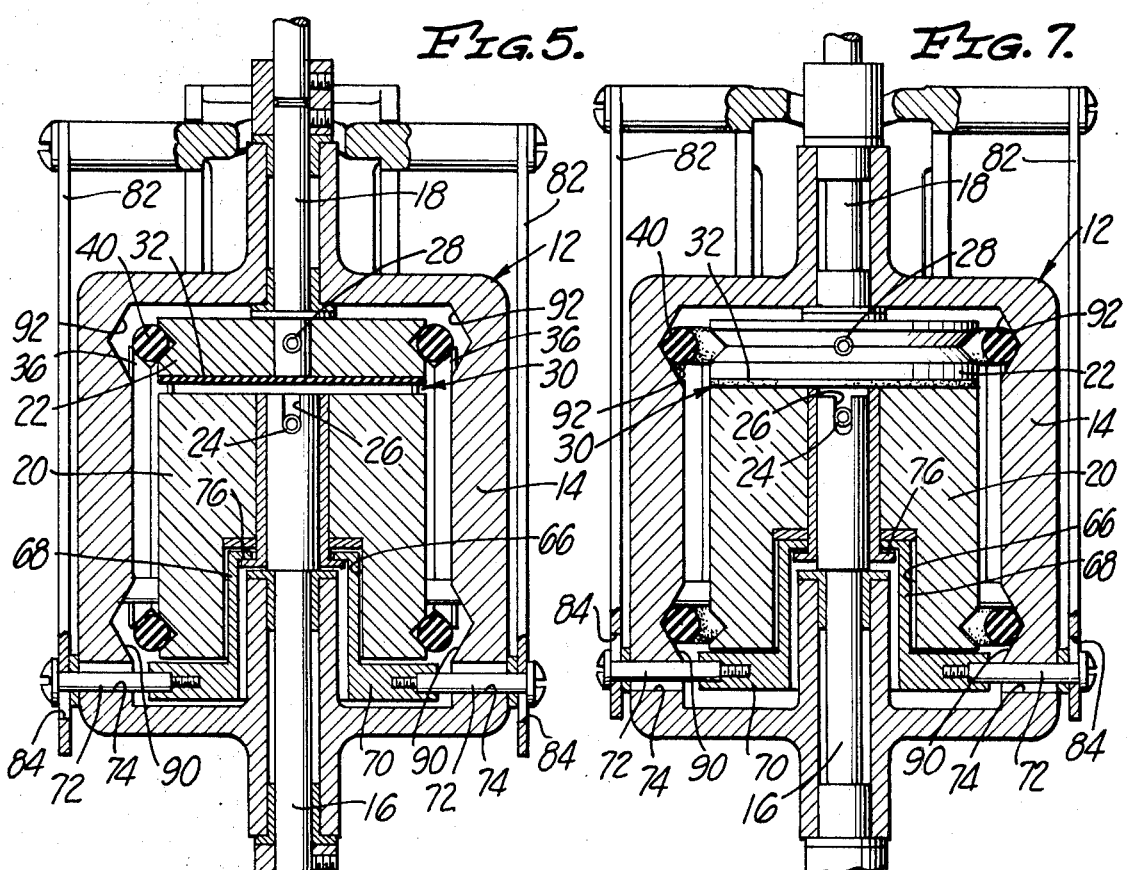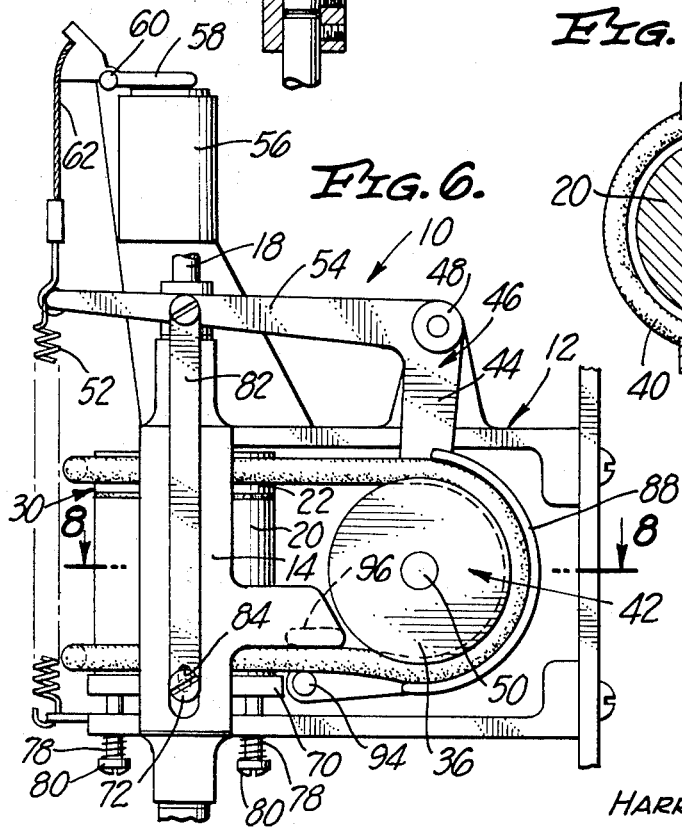

REVERSIBLE DRIVE

BACKGROUND OF INVENTION

The present invention relates in general to a reversible drive of the belt-and-pulley type and, more particularly, to a reversible drive comprising: a supporting structure; coaxial, axially spaced drive pulleys rotatably mounted on the supporting structure, either drive pulley being the driving or input pulley and the other being the driven or output pulley; coaxial, axially spaced idler pulleys offset to one side of the drive pulleys and rotatable about an axis perpendicular to and spaced laterally from the axis of the drive pulleys; an endless belt trained around one of the drive pulleys, one of the idler pulleys, the other drive pulley and the other idler pulley, in that order; shiftable mounting means on the supporting structure and carrying the idler pulleys for moving the idler pulleys toward and away from the drive pulleys to slacken and tighten the belt; clutch means for connecting and disconnecting the drive pulleys; and actuating means connected to the mounting means and the clutch means, the actuating means either engaging the clutch means to connect the drive pulleys and shifting the mounting means toward the drive pulleys to slacken the belt, and thus achieving a direct drive between the drive pulleys, or, alternatively, disengaging the clutch means to disconnect the drive pulleys and shifting the mounting means away from the drive pulleys to tighten the belt, and thus achieving a reverse drive between the drive pulleys.

SUMMARY AND OBJECTS OF INVENTION

The primary object of the present invention is to provide a reversible drive of the foregoing type having means for disengaging the belt from at least the drive pulleys when the belt is slackened and the drive pulleys are connected in direct drive, thereby preventing rubbing of the belt.

Important objects of the invention are to provide a reversible drive wherein the belt-disengaging means is embodied in the belt itself and, more particularly, a reversible drive wherein the belt has a built-in memory causing it, when unrestrained, to assume a configuration such that it holds itself away from at least the drive pulleys when the belt is slackened and the drive pulleys are connected in direct drive.

Still more particularly, an object of the invention is to provide a resilient belt of circular cross section having a built-in memory causing it, when unrestrained, to assume a circular configuration.

An important object of the invention is to provide a reversible drive of the foregoing character wherein the belt is simply a conventional, commercially available, elastomeric O-ring. Such a device inherently has the built-in memory for a circular configuration which is necessary to enable it to operate as a self-disengaging belt in the manner hereinbefore outlined.

Another object of the invention is to provide guard means for limiting outward, self-disengaging displacement of the belt away from the drive pulleys and the idler pulleys when the belt is slackened and the drive pulleys are connected in direct drive.

Another important object is to provide a reversible drive wherein one of the drive pulleys is shiftable axially into and out of engagement with the other to form the clutch means, and wherein the actuating means has means for axially moving a corresponding portion of the belt toward the stationary drive pulley as the shiftable drive pulley is moved axially towards the stationary drive pulley. This keeps the belt properly in register with the axially shiftable drive pulley.

Although usable for other purposes, a reversible drive utilizing a conventional O-ring as a clutch and a driving element in the reverse mode is particularly suitable for use as a capstan drive in magnetic tape recording and/or playback equipment. In such an environment, the reversible drive is of a size readily lending itself to the use of a conventional O-ring as a self-disengaging belt in the direct mode. The inherent ability of the O-ring belt to prevent rubbing in direct drive is especially important in tape equipment because it insures that the belt will not act as a brake to tend to reduce the tape speed.

The foregoing objects, advantages, features and results of the present invention, together with various other objects, advantages, features and results thereof which will be evident to those skilled in the reversible drive art in the light of this disclosure, may be achieved with the exemplary embodiment of the invention described in detail hereinafter and illustrated in the accompanying drawings.

DESCRIPTION OF DRAWINGS

In the drawings:

FIG. 5 is an enlarged, vertical sectional view taken as indicated by the arrowed line 5–5 of FIG. 1 and showing the reversible drive in its reverse mode;

FIG. 6 is a view similar to FIG. 1, but showing the reversible drive in its direct mode;

Similarly, FIG. 7 is a view similar to FIG. 5, but showing the reversible drive in its direct mode; and FIG. 8 is a sectional view taken as indicated by the arrowed line 8–8 of FIG. 6, and showing the reversible drive in its direct mode.

DESCRIPTION OF EXEMPLARY EMBODIMENT OF INVENTION

Figure 1:
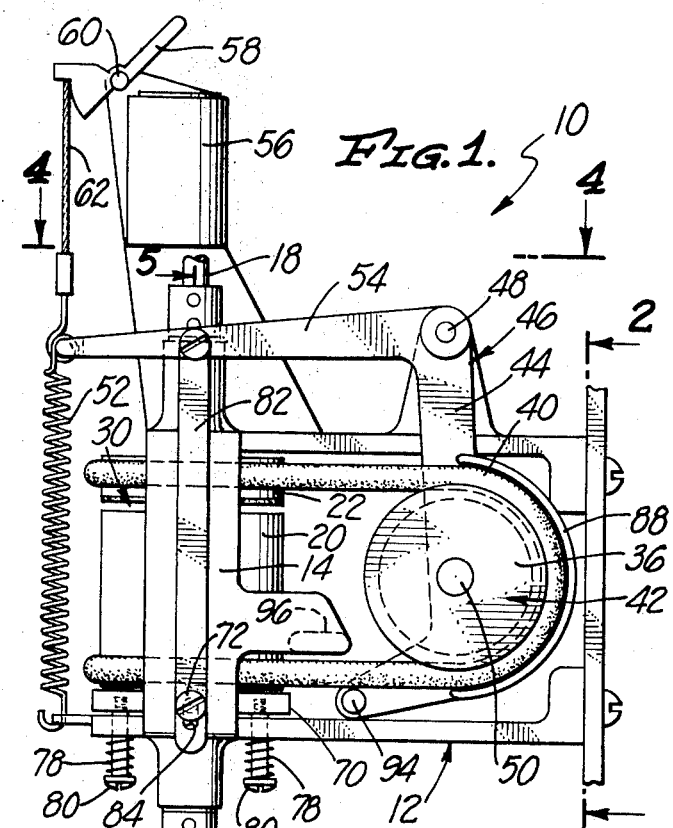
FIG. 1 is what may for convenience be described as a side elevational view of a reversible drive of the invention, in its reverse mode.
Figure 2:
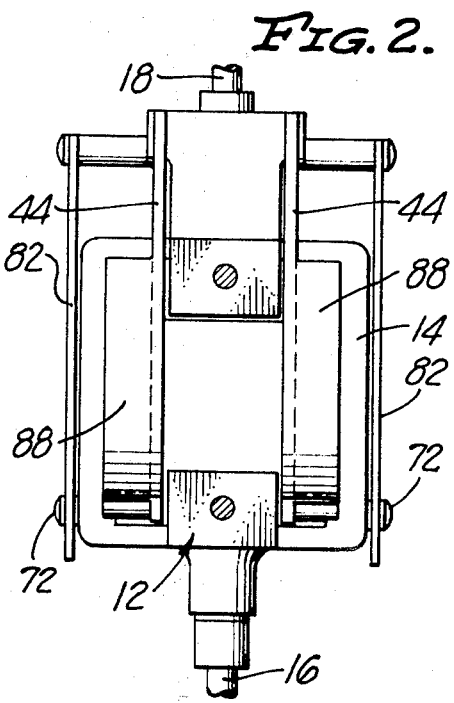
FIG. 2 is an end elevational view, taken as indicated by the arrowed line 2–2 of FIG. 1.
Figure 3:
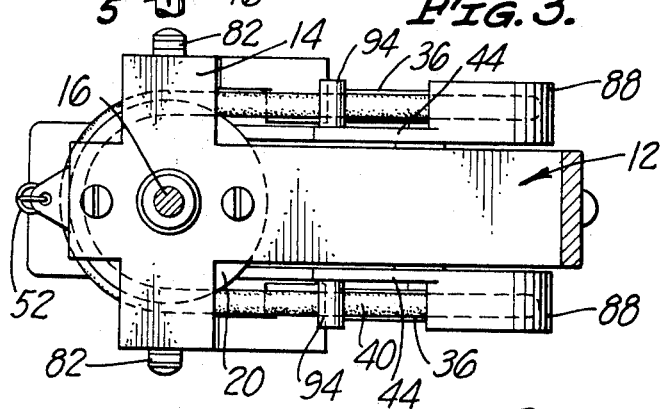
FIG. 3 is a bottom plan view of the reversible drive in its reverse mode.
Figure 4:
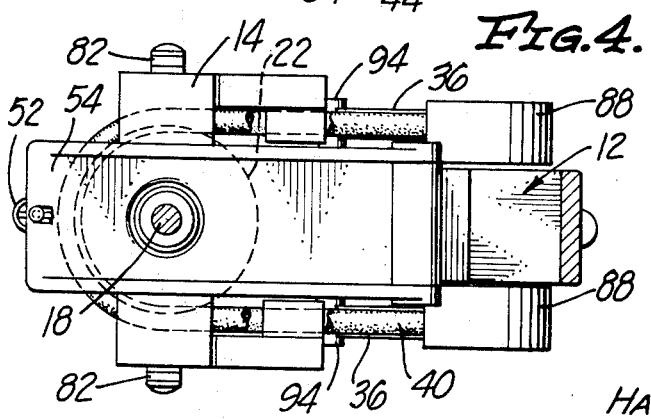
FIG. 4 is a top plan view, partially in section, taken as indicated by the arrowed line 4–4 of FIG. 1, and showing the reversible drive in its reverse mode.

The reversible drive of the invention is designated generally in the drawings by the numeral 10 and is provided with a suitable supporting structure or frame 12 shown as including a box section 14. In the construction illustrated, coaxial lower and upper drive shafts 16 and 18 respectively project upwardly and downwardly into the box section 14 and are rotatably mounted in suitable thrust and journal bearings, not specifically identified, carried by the lower and upper portions of the box section.

The lower and upper drive shafts 16 and 18 respectively have connected thereto coaxial, axially spaced, lower and upper drive pulleys 20 and 22. The lower drive pulley 20 is vertically movable into and out of engagement with the upper drive pulley 22, there being a pin 24 and slot 26 connection between the lower drive shaft 16 and the lower drive pulley 20 to permit such vertical movement of the lower drive pulley. The upper drive pulley 22 is rigidly connected to the upper drive shaft 18, as by a pin 28.

The upper end of the lower drive pulley 20 and the lower end of the upper drive pulley 22 constitute a clutch means 30 for connecting and disconnecting the drive pulleys 20 and 22, the clutch means being shown disengaged in FIG. 5 and engaged in FIG. 7. Preferably, at least one of the drive pulleys, e.g., the drive pulley 22, is provided with a clutch facing 32.

It will be understood that either of the drive shafts 16 and 18 may be a driving or input shaft, the other being a driven or output shaft. The input shaft may be driven in any suitable manner, and the output shaft may drive any suitable device, such as a capstan of a magnetic tape recorder and/or playback apparatus.

Coaxial, axially spaced idler pulleys 36 are offset to one side of the drive pulleys 20 and 22 and are rotatable about an axis perpendicular to and spaced laterally from the common axis of the drive pulleys. The axial spacing of the idler pulleys 36 is approximately equal to the diameter of the drive pulleys 20 and 22 and, conversely, the axial spacing of the annular grooves in the drive pulleys 20 and 22, when the lower drive pulley is in its lower position to disengage the clutch means 30, is approximately equal to the diameter of the idler pulleys 36.

An endless belt 40, to be described in more detail hereinafter, is trained around the lower drive pulley 20, one of the idler pulleys 36, the upper drive pulley 22 and the other idler pulley, in that order. Viewed differently, the endless belt 40 is trained around the lower and upper drive pulleys 20 and 22, and the resulting loops formed in the endless belt are then trained around the respective idler pulleys 36. With the dimensional relationships specified in the preceding paragraph, the angular wraps around the respective pulleys are all substantially 180°, when the lower drive pulley 20 is in its lower position to disengage the clutch means 30. Thus, all the interpulley runs of the endless belt 40 are substantially parallel, under such conditions.

The idler pulleys 36 are carried by a shiftable mounting means 42 for moving them toward and away from the drive pulleys 20 and 22 to slacken and tighten the belt 40, the belt being shown slackened in FIGS. 6 to 8 and being shown tightened in FIGS. 1 to 5. More particularly, the shiftable mounting means 42 comprises depending arms 44 of a crank 46 which is pivotally mounted on the frame 12 at 48. The idler pulleys 36 are rotatably mounted on the respective depending arms 44 at 50. As will be apparent, pivoting of the crank 46 in the clockwise direction, as viewed in FIGS. 1 and 6, results in slackening of the belt 40.

The crank 46 is biased in the counterclockwise direction, to tighten the belt 40, by a tension spring 52 connected at one end to the frame 12 and at its other end to an arm 54 of the crank 46 which projects from the pivot point 48 toward and past the drive pulley axis. The crank 46 may be pivoted in the clockwise direction to slacken the belt 40 in any suitable manner. In the construction shown, a solenoid 56 mounted on the frame 12 acts on an armature 58 pivoted on the frame at 60 and connected to the crank arm 54 by a cable 62. As will be apparent, when the solenoid 56 is energized, it attracts the armature 58, which pivots the crank 46 in the clockwise direction in opposition to the action of the tension spring 52.

Referring to FIGS. 5 and 7, the lower drive pulley 20 is provided in its lower end with a central recess 66 for a plunger 68 having an external annular flange 70 below the lower drive pulley. Laterally spaced, coaxial, headed pins 72 extend inwardly through vertical slots 74 in the sides of the box section 14 of the frame 12, and are secured at their inner ends to the plunger flange 70, as by being threaded thereinto. The plunger 68 is biased downwardly against an annular seat 76 by compression coil springs 78, FIGS. 1 and 6, seated at their upper ends against the frame 12 and seated at their lower ends on the heads of screws 80 slidable vertically relative to the frame 12 and threaded into the plunger flange 70.

When the crank 46 is pivoted in the clockwise direction, as viewed in FIGS. 1 and 6, to slacken the belt 40, the plunger 68 is lifted, after the belt has been slackened, to cause the plunger to lift the lower drive pulley 20 into frictional engagement with the upper drive pulley 22, thereby engaging the clutch means 30 to provide a direct drive connection between the lower and upper drive pulleys. This effect is achieved by depending links 82 pivotally connected at their upper ends to the crank arm 54, and having at their lower ends vertical slots 84 receiving therein the pins 72 connected to the plunger flange 70. With this construction, as the crank 46 is pivoted in the clockwise direction to slacken the belt 40, it also, through the links 82, causes the plunger 68 to lift the lower drive pulley 20 to engage the clutch means 30. The slots 84 in the lower ends of the links 82 serve to permit slackening of the belt 40 before engagement of the clutch means 30.

Considering the operation of the reversible drive 10 as thus far described, it will be apparent that when the crank 46 is in the position shown in FIGS. 1 to 5 of the drawings, the belt 40 is tightened by the tension spring 52 and the clutch means 30 is disengaged. Under such conditions the reversible drive 10 operates in its reverse mode, the lower and upper drive pulleys 20 and 22, and thus the lower and upper drive shafts 16 and 18, rotating in opposite directions. However, when the solenoid 56 is energized to pivot the crank 46 in the clockwise direction, or when the crank is thus pivoted in any suitable manner, the idler pulleys 36 are first moved toward the drive pulleys 20 and 22 to slacken the belt 40, and the lower drive pulley 20 is then moved upwardly into engagement with the upper drive pulley 22 to engage the clutch means 30 connecting the two drive pulleys together. Under such conditions, the reversible drive 10 operates in its forward or direct mode, the two drive pulleys being frictionally coupled together to rotate in unison.

The endless belt 40 constitutes means for disengaging itself from the pulleys 20, 22 and 36, and particularly the drive pulleys 20 and 22, when the belt is slackened and the clutch means 30 engaged so that the reversible drive 10 operates in the direct mode, thereby preventing rubbing contact between the drive pulleys and the belt, and consequent possible speed reduction and/or damage to the belt.

The foregoing self-disengaging effect is achieved by providing the belt 40 with a circular configuration, now shown, when unrestrained, and by providing it with a memory for that configuration. Consequently, when the belt 40 is slackened, it tends to resume its circular configuration, whereupon it displaces itself outwardly away from the various pulleys, and especially the drive pulleys 20 and 22, as shown in FIGS. 6 to 8 of the drawings.

Still more particularly, the foregoing effect can be achieved readily by utilizing for the endless belt 40 a conventional, commercially available, elastomeric O-ring of suitable dimensions. This provides a very simple and inexpensive self-disengaging belt 40, which is an important feature of the invention.

Guard means are provided for limiting outward displacement of the belt away from the drive pulleys 20 and 22 and the idler pulleys 36 when the belt is slackened. More particularly, the crank arms 44 carrying the idler pulleys 36 are provided thereon with crescent-shaped guards 88 within which the endless belt 48 fits relatively closely, as shown in FIG. 1, when it is tightened. The sides of the box section 14 of the frame 12 are provided with lower and upper guard grooves 90 and 92 for receiving therein corresponding portions of the belt 40 when slackened, and for limiting outward displacement of such belt portions away from the lower and upper drive pulleys 20 and 22. The upper guard grooves 92 register with the annular groove in the upper drive pulley 22, and the lower guard grooves 90 register with the upper position of the annular groove in the lower drive pulley 20, as shown in FIG. 7.

To insure outward expansion of the corresponding portion of the belt 40 into the lower guard grooves 90 upon upward shifting of the lower drive pulley 20 to engage the clutch means 30, the crank arms 44 are provided thereon with inwardly extending, coaxial pins 94 which engage the belt loop around the lower drive pulley 20 and shift it upwardly into register with the lower guard grooves 90 as the lower drive pulley 20 is shifted upwardly in engaging the clutch means 30. This belt loop engages suitable stops 96, FIG. 6, to limit upward displacement by the pins 94.

With the foregoing construction, when the crank 46 is pivoted in the clockwise direction, as viewed in FIGS. 1 and 6, to slacken the endless belt 40, the belt tends to disengage itself from all of the pulleys 20, 22, and 36. Since the guards 88 are quite close to the idler pulleys 36, the outward displacement of the belt 40 adjacent the idler pulleys 36 is limited. This causes the loops in the belt leading to the drive pulleys 20 and 22 to move toward the drive pulleys to provide greater outward displacement of the belt adjacent the two drive pulleys to insure against any rubbing contact in the direct mode, as clearly shown in FIGS. 7 and 8 of the drawings. As previously explained, the pins 94 on the crank arms 44 insure maintaining the belt loop leading to the lower drive pulley 22 in register with the annular groove therein.

Although an exemplary embodiment of the invention has been disclosed herein for purposes of illustration, it will be understood that various changes, modifications and substitutions may be incorporated in such embodiment.

I claim:

1. In a reversible drive of the belt and pulley type, the combination of:
   a. a supporting structure;
   b. coaxial, axially spaced drive pulleys rotatably mounted on said supporting structure;
   c. coaxial, axially spaced idler pulleys offset to one side of said drive pulleys and rotatable about an axis perpendicular to and spaced laterally from the axis of said drive pulleys;
   d. an endless belt trained around one of said drive pulleys, one of said idler pulleys, the other of said drive pulleys and the other of said idler pulleys, in that order;
   e. shiftable mounting means on said supporting structure and carrying said idler pulleys and movable toward and away from said drive pulleys to slacken and tighten said belt;
   f. engageable and disengageable clutch means for connecting and disconnecting said drive pulleys;
   g. actuating means connected to said mounting means and said clutch means for either engaging said clutch means to connect said drive pulleys and shifting said mounting means toward said drive pulleys to slacken said belt, and thus achieve a direct drive between said drive pulleys, or, alternatively, disengaging said clutch means to disconnect said drive pulleys and shifting said mounting means away from said drive pulleys to tighten said belt, and thus achieve a reverse drive between said drive pulleys; and
   h. said belt having a circular cross section and having a built-in memory causing it, when unrestrained, to assume a circular configuration so that said belt acts as a belt disengaging means for disengaging itself from at least said drive pulleys when said drive pulleys are connected in direct drive and said belt is slackened.

2. A reversible drive according to claim 1 wherein said belt is an O-ring.

3. A reversible drive as set forth in claim 2 wherein said supporting structure includes guard means limiting outward displacement of said belt away from said drive pulleys when said drive pulleys are connected in direct drive and said belt is slackened.

4. A reversible drive as defined in claim 3 wherein one of said drive pulleys is shiftable axially toward and away from the other by said actuating means to engage and disengage said clutch means, and wherein said actuating means includes means for axially moving a corresponding portion of said belt toward the stationary drive pulley when axially moving said shiftable drive pulley toward said stationary drive pulley.

5. A reversible drive according to claim 3 wherein said mounting means includes guard means limiting outward displacement of said belt away from said idler pulleys when said drive pulleys are connected in direct drive and said belt is slackened.

6. A reversible drive as defined in claim 1 wherein said actuating means comprises a crank having arms carrying said idler pulleys and an arm connected to said clutch means.

7. In a belt and pulley drive, the combination of:
   a. pulleys rotatable about axes at angles to each other;
   b. a belt trained around said pulleys in sequence;
   c. means for moving at least one of said pulleys toward and away from another thereof to slacken and tighten said belt;
   d. said belt having a circular cross section and having a built-in memory causing it, when unrestrained, to assume a circular configuration; and
   e. whereby said belt inherently disengages at least one of said pulleys when slackened.